(12) United States Patent
Lin et al.

(10) Patent No.: US 9,978,129 B2
(45) Date of Patent: *May 22, 2018

(54) PATCH PARTITIONS AND IMAGE PROCESSING

(71) Applicant: Adobe Systems Incorporated, San Jose, CA (US)

(72) Inventors: Zhe Lin, Fremont, CA (US); Jianchao Yang, San Jose, CA (US); Hailin Jin, San Jose, CA (US); Xin Lu, State College, PA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/707,418

(22) Filed: Sep. 18, 2017

(65) Prior Publication Data

US 2018/0005354 A1    Jan. 4, 2018

Related U.S. Application Data

(63) Continuation of application No. 14/280,421, filed on May 16, 2014, now Pat. No. 9,767,540.

(51) Int. Cl.
*G06K 9/62* (2006.01)
*G06T 5/00* (2006.01)
*G06K 9/00* (2006.01)

(52) U.S. Cl.
CPC .............. *G06T 5/005* (2013.01); *G06T 5/002* (2013.01); *G06K 9/00664* (2013.01);
(Continued)

(58) Field of Classification Search
CPC ........... G06T 5/002; G06T 5/005; G06T 5/50; G06T 2207/20084; G06T 2207/20081
(Continued)

(56) References Cited

U.S. PATENT DOCUMENTS 7,941,004 B2   5/2011   Zhu et al.
8,374,457 B1   2/2013   Wang et al.
(Continued)

OTHER PUBLICATIONS

"Final Office Action", U.S. Appl. No. 14/280,421, dated Jan. 27, 2017, 13 pages.
(Continued)

*Primary Examiner* — Samir Ahmed
(74) *Attorney, Agent, or Firm* — Wolfe-SBMC

(57) ABSTRACT

Patch partition and image processing techniques are described. In one or more implementations, a system includes one or more modules implemented at least partially in hardware. The one or more modules are configured to perform operations including grouping a plurality of patches taken from a plurality of training samples of images into respective ones of a plurality of partitions, calculating an image processing operator for each of the partitions, determining distances between the plurality of partitions that describe image similarity of patches of the plurality of partitions, one to another, and configuring a database to provide the determined distance and the image processing operator to process an image in response to identification of a respective partition that corresponds to a patch taken from the image.

20 Claims, 9 Drawing Sheets

(52) U.S. Cl.
CPC .. *G06K 9/6218* (2013.01); *G06T 2207/20081* (2013.01); *G06T 2207/20084* (2013.01)

(58) Field of Classification Search
USPC ................ 382/155, 159, 181, 190, 220, 273
See application file for complete search history.

(56) References Cited

U.S. PATENT DOCUMENTS

| | | | |
|---|---|---|---|
| 8,655,109 | B2 | 2/2014 | Lin et al. |
| 9,189,834 | B2 | 11/2015 | Lin et al. |
| 9,286,540 | B2 | 3/2016 | Lin et al. |
| 9,767,540 | B2* | 9/2017 | Lin ..................... G06T 5/005 |
| 2003/0161500 | A1 | 8/2003 | Blake et al. |
| 2006/0115145 | A1 | 6/2006 | Bishop et al. |
| 2007/0041663 | A1 | 2/2007 | Cho et al. |
| 2007/0177817 | A1 | 8/2007 | Szeliski et al. |
| 2008/0002856 | A1 | 1/2008 | Ma et al. |
| 2009/0274385 | A1* | 11/2009 | Zhu ..................... G06T 3/4053 382/264 |
| 2011/0047163 | A1 | 2/2011 | Chechik et al. |
| 2011/0097008 | A1 | 4/2011 | Cao et al. |
| 2012/0141044 | A1 | 6/2012 | Kwatra et al. |
| 2012/0219224 | A1 | 8/2012 | Ding et al. |
| 2012/0281923 | A1* | 11/2012 | Irani ..................... G06K 9/3241 382/218 |
| 2012/0307116 | A1 | 12/2012 | Lansel et al. |
| 2013/0034313 | A1 | 2/2013 | Lin et al. |
| 2013/0156340 | A1 | 6/2013 | Porikli et al. |
| 2013/0202177 | A1 | 8/2013 | Bar-Aviv et al. |
| 2014/0119664 | A1 | 5/2014 | Ioffe et al. |
| 2014/0219552 | A1 | 8/2014 | Porikli et al. |
| 2014/0301661 | A1 | 10/2014 | Voronov et al. |
| 2015/0036943 | A1 | 2/2015 | Lin |
| 2015/0110386 | A1 | 4/2015 | Lin et al. |
| 2015/0131915 | A1 | 5/2015 | Lin et al. |
| 2015/0139557 | A1 | 5/2015 | Lin et al. |
| 2015/0332438 | A1 | 11/2015 | Lin et al. |

OTHER PUBLICATIONS

"First Action Interview Office Action", U.S. Appl. No. 14/280,421, dated Jul. 26, 2016, 3 pages.

"Notice of Allowance", U.S. Appl. No. 14/080,659, dated Aug. 11, 2015, 7 pages.

"Notice of Allowance", U.S. Appl. No. 14/085,488, dated Oct. 26, 2015, 4 pages.

"Notice of Allowance", U.S. Appl. No. 14/280,421, dated May 19, 2017, 8 pages.

"Pre-Interview Communication", U.S. Appl. No. 14/080,659, dated Jun. 5, 2015, 4 pages.

"Pre-Interview Communication", U.S. Appl. No. 14/085,488, dated Jul. 30, 2015, 3 pages.

"Pre-Interview Communication", U.S. Appl. No. 14/280,421, dated Feb. 25, 2016, 3 pages.

"Restriction Requirement", U.S. Appl. No. 14/280,421, dated Nov. 19, 2015, 6 pages.

"Supplemental Notice of Allowance", U.S. Appl. No. 14/085,488, dated Feb. 10, 2016, 2 pages.

Buades,"A Review of Image Denoising Algorithms, with a New One", 2005 Society for Industrial and Applied Mathematics, 2005, 42 pages.

Burger,"Image denoising: Can plain Neural Networks compete with BM3D", In CVPR—retrieved at <<http://www.is.tuebingen.mpg.de/fileadmin/user_upload/files/publications/2012/CVPR-2012-Burger.pdf>>, 2012, 8 pages.

Dabov,"Image denoising by sparse 3D transform-domain collaborative filtering", IEEE Transactions on Image Processing, vol. 16, No. 8, Aug. 2007, 16 pages.

Elad,"Image Denoising via Sparse and Redundant Representations Over Learned Dictionaries", IEEE Transactions on Image Processing, vol. 15, No. 12, Dec. 2006, 10 pages.

Jain,"Data Clustering: A Review", ACM Computing Surveys, vol. 31, No. 3, Sep. 1999, 60 pages.

Mosseri,"Combining the Power of Internal and External Denoising", In ICCP—retrieved at <<http://www.wisdom.weizmann.ac.il/~mariazon/papers/Mosseri_Zontak_Irani_ICCP2013.pdf>>, 2013, 9 pages.

Porikli,"SAR Despeckle Filtering by Sparse Coding on Affinity Nets (SCAN)", Mitsubishi Electric Research Laboratories, Inc., Apr. 2012, 6 pages.

Soni,"Categorization of Several Clustering Algorithms from Different Perspective: A Review", International Journal of Advanced Research in Computer Science and Software Engineering, vol. 2, Issue 8, Aug. 2012, 6 pages.

* cited by examiner

PATCH PARTITIONS AND IMAGE PROCESSING

RELATED APPLICATION

This application is a continuation of and claims priority to U.S. patent application Ser. No. 14/280,421, filed May 16, 2014, entitled "Patch Partitions and Image Processing", the entire disclosure of which is hereby incorporated by reference herein in its entirety.

BACKGROUND

The number of images and the settings in which images may be captured is ever increasing. For example, users have ready access to an image capture device in a variety of different settings through inclusion on mobile phones, tablet computers, and so on.

Because of the variety in settings, however, the images may become corrupted, e.g., noisy. This corruption may be due to limitations of the setting (e.g., low light, dusty) and even due to limitations of the image capture device itself, e.g., limitations in capturing motion, resolution, sensitivity, and so forth. Consequently, this corruption may interfere with a user's enjoyment of the actual image itself.

Although techniques have been developed to process the image to remove this corruption, at least partially, these techniques may be resource intensive and thus limited in the amount of functionality that may be made available to a user. Other image processing techniques may also suffer from similar limitations due to the amount of resources used to perform the techniques.

SUMMARY

Patch partition and image processing techniques are described. In one or more implementations, a system includes one or more modules implemented at least partially in hardware. The one or more modules are configured to perform operations including grouping a plurality of patches taken from a plurality of training samples of images into respective ones of a plurality of partitions, calculating an image processing operator for each of the partitions, determining distances between the plurality of partitions that describe image similarity of patches of the plurality of partitions, one to another, and configuring a database to provide the determined distance and the image processing operator to process an image in response to identification of a respective partition that corresponds to a patch taken from the image.

In one or more implementations, one or more patches taken from an image are assigned as being associated with respective ones of a plurality of partitions based on similarity of the one or more patches to patches in the partitions that are taken from a source that is external to the image. An image processing operator associated with the corresponding one or more partitions is obtained based on a patch selected form an assigned one of the partitions. The obtained image processing operator is applied as part of an image processing operation by the computing device to the selected patch and one or more other patches also assigned to the partition that includes the selected patch.

In one or more implementations, one or more patches taken from an image are assigned as being associated with respective ones of a plurality of partitions based on similarity of the one or more patches to patches in the partitions that are taken from a source that is external to the image. One or more image processing operations are performed that are based at least in part on a weighted average of a distance associated with the respective ones of the plurality of partitions that describes similarity of the one or more patches to other patches in the respective one of the plurality of partitions and an image processing operator that is associated with the respective partition.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Image processing techniques may be utilized to provide a wide range of functionality, such as image denoising, super-resolution (e.g., to increase resolution of an image), optical flow (e.g., to track motion of an object in video), texture synthesis, and so forth. For example, denoising techniques may be utilized to remove noise from an image that may be introduced by an image capture device, such as resolution and light sensitivity, an environment in which the image was captured, and so on. Although conventional techniques have been introduced to remove noise from an image, these conventional techniques may result in blurring, consume a significant amount of resources (e.g., due to a training size problem for training-based methods), and so on.

Patch partition and image processing techniques are described. In one or more implementations, a common/complex patch technique may be employed in the generation of an external database for image processing. For patches that reoccur in many images of a training set (i.e., "common" patches), an image processing operator (e.g., denoising operator) may be learned for those patches. However, patches that reoccur in a limited number of images (e.g., below a threshold number), these patches may be considered "complex patches". These partitions may then be used to generate an image processing operator (e.g., a denoising operator) that is associated with a respective one of the partitions.

To process a subsequent image, an image may be processed using the partitions of the external database. For the common patches, image processing operators may be located that correspond to partitions from the external database that "match" the common patch taken from the image. Thus, the external database may be utilized to quickly determine an image processing operator to be applied to the patch. For "complex" patches, internal processing techniques (e.g., using patches internal to the image) may be performed. In this way, efficiency of image processing may be improved. Further discussion of these and other techniques that involve image distances, weighting, and so on may be found in relation to the following sections.

In the following discussion, an example environment is first described that is operable to perform the patch partition and image processing techniques described herein. Example procedures are then described, which may be performed in the example environment. However, it should be noted that the example environment is not limited to performance of the example procedures and the example procedures are not limited to performance in the example environment, the discussion of which being examples thereof.

Example Environment

Figure 1:
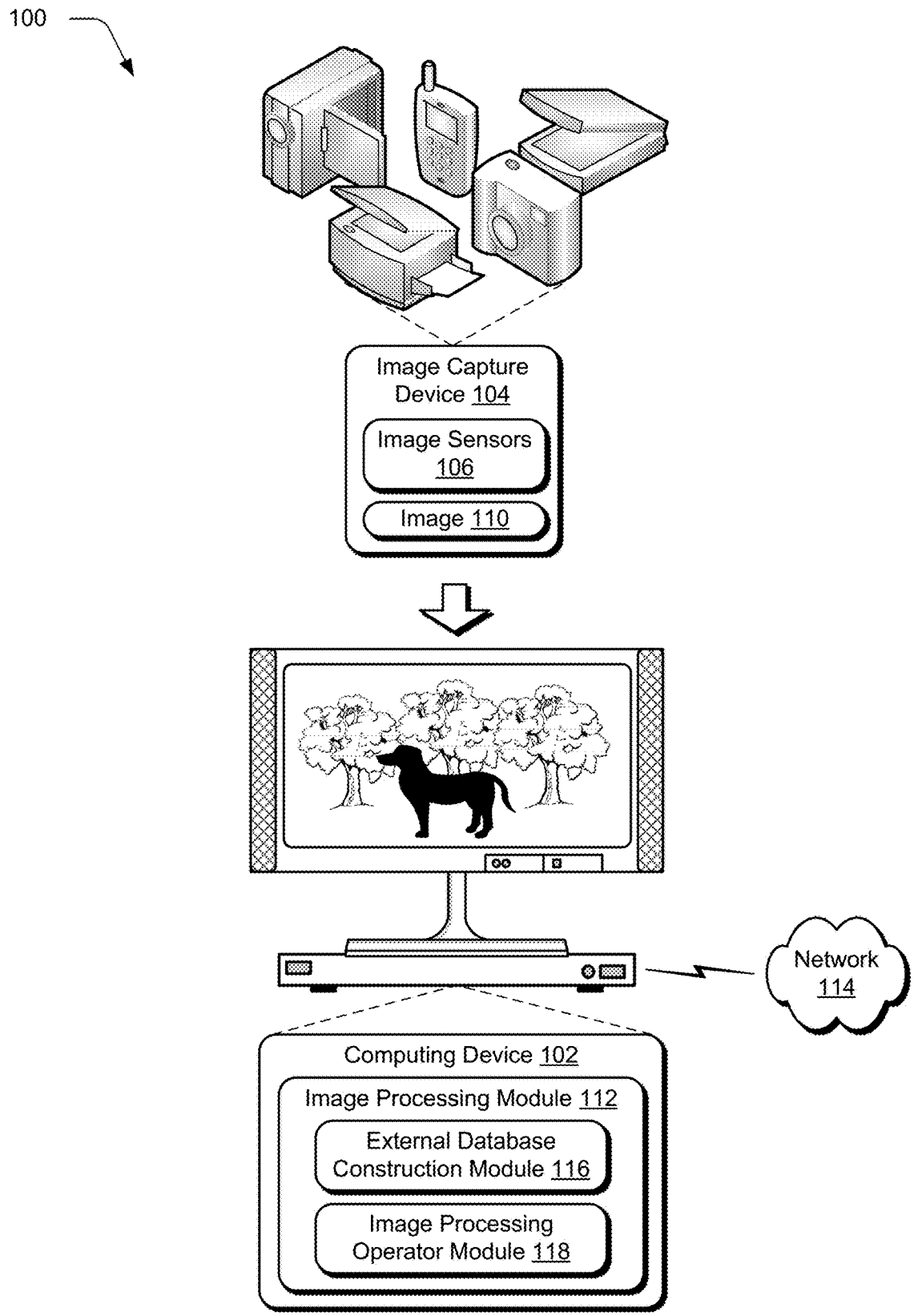
FIG. 1 is an illustration of an environment in an example implementation that is operable to employ patch partition and image processing techniques described herein.

FIG. 1 is an illustration of an environment 100 in an example implementation that is operable to employ the patch partition and image processing techniques described herein. The illustrated environment 100 includes a computing device 102 and a plurality of examples of image capture devices 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 9.

The image capture device 104 may also be configured in a variety of ways. Illustrated examples of such configurations include a standalone camera such as a dedicated device, part of a mobile phone or tablet, and so on. Other examples are also contemplated. For example, each of the image capture device 104 may be configured as a single camera, scanner, copier, mobile device (e.g., smart phone), and so forth. Additionally, although illustrated separately the image capture device 104 may be incorporated as part of the computing device 102, e.g., following the smart phone or tablet example above.

The image capture device 104 is illustrated as including image sensors 106 (e.g., a charge coupled device) that are configured to capture an image 110. The image 110, for instance, may be formed as a digital image having data describing values captured by the image sensors 106. Accordingly, the image 110 may be configured in a variety of different ways, such as representative in a raw image format, consistent with a Bayer pattern, a RGB image format, and so forth.

The computing device 102 is illustrated as including an image processing module 112. The image processing module 112 is representative of functionality to perform one or more techniques that are usable to process an image. Although illustrated as implemented locally on the computing device, functionality of the image processing module may also be implemented in a distributed environment, remotely via a network 114 (e.g., "over the cloud") as further described in relation to FIG. 9, and so on.

An example of image processing that may be performed by the image processing module 112 is represented as an external database construction module 116 and an image processing operator module 118. The external database construction module 116 is representative of functionality to generate an external database of patches that may be used in processing the image 110, further discussion of which may be found in relation to FIG. 2. The image processing operator module 118 is representative of functionality to process the image 110, which may include use of patches taken from the image 110 as well as by leveraging image processing operators taken from the external database constructed by the external database construction module 116. Further discussion of image processing performed by the image processing operator module 118 may be found in relation to FIGS. 3-4.

Figure 2:
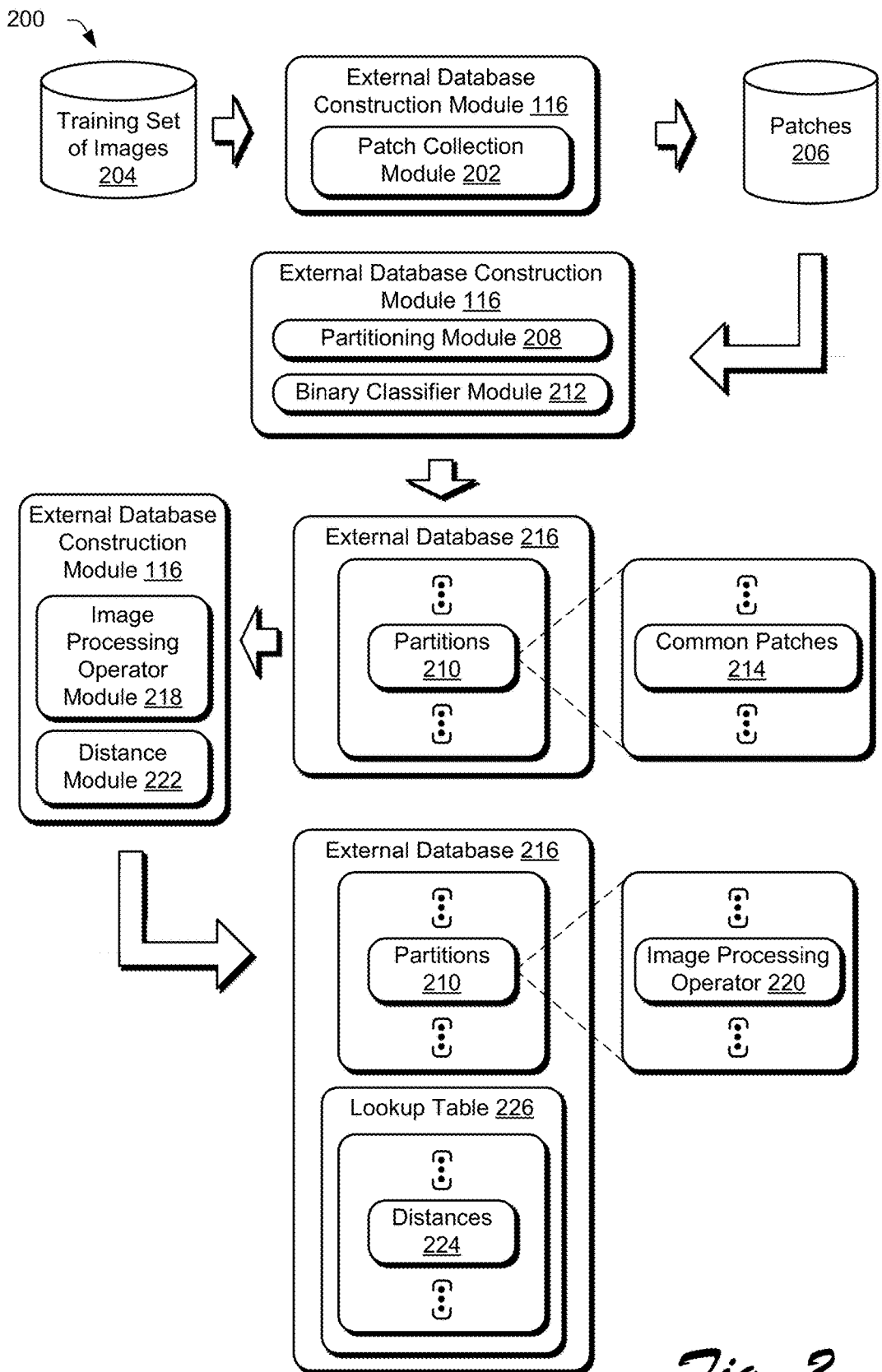
FIG. 2 is an illustration of a system in an example implementation showing an external database construction module of FIG. 1 in greater detail.

FIG. 2 depicts a system 200 in an example implementation showing the external database construction module 116 of FIG. 1 in greater detail as constructing an external database. The external database construction module 116 is illustrated as including a patch collection module 202. The patch collection module 202 is representative of functionality to sample a training set of images 204 (e.g., noise-free images) to form patches 206. For example, patches 206 may be sampled (e.g., randomly) from a collection of images having little (e.g., low levels) to no noise, which results in a collection of noise-free patches that may overlap each other.

The patches 206 are then employed by a partitioning module 208 of the external database construction module 116 to form partitions 210 that include respective subsets of the image patches 206. For example, a large set of partitions 210 may be used to capture variation of patches 206 taken from images and to make each of the partitions 210 represent a unique structure with low variance. To support this, fine grained partitioning may be performed by the partitioning module 208, e.g., approximately 100,000 to 1,000,000 partitions. Other examples are also contemplated in which fine grained partitioning is not performed, e.g., to form a smaller number of partitions to speed processing, such as 10,000 partitions.

A partitioning algorithm, for instance, may be used by the partitioning module 208 (e.g., a nearest neighbor search approach, a hierarchical k-means clustering algorithm, and so on) to partition the input patch space that includes the patches 206. The partition (i.e., cluster) centers, which may be thought of as leaf nodes in a tree-like structure, may then be used as anchor points for learning image processing operators, such as for regression functions used for denoising as further described below. The tree-like structure may also be used to locate corresponding partitions (e.g., by "walking the tree") as further described below in relation to FIG. 3 to process an image.

The external database construction module 116 is also illustrated as including a binary classifier module 212. The binary classifier module 212 is representative of functionality to distinguish "common" patches 214 (e.g., patches 206 having an image similarity, one to another, that occurs in the training set of images 204 over a threshold number of times) from "complex" patches, e.g., patches 206 from the training set of images 204 having an image similarity, one to another, that does not occur more than the threshold number of times. The partitions 210 of the common patches 214 may then be used to form an external database 216.

The partitions 210 are then utilized by an image processing operator module 218 to calculate an image processing operator 220 for each of the partitions for inclusion in the external database 216. Continuing with the previous example, the image processing operators 220 may be configured as a denoising operator. For each of the partitions 210, the common patches 214 included in that partition 210 are obtained. Synthetic noise may then be added to these clean patches to generate noisy/clean patch pairs. Non-negative linear regressors may then be trained as shown in the following equation as a denoising operator for each partition:

$$\min \sum_i \sum_{j \in i} \|W_i y_j - x_j\|_2^2 \quad \text{s.t., } W \geq 0$$

A centroid and the image processing operator 220 generated by the image processing operator module 218 (e.g., denoising operator) may then be saved as part of the external database 216.

The external database construction module 116 is also illustrated as including a distance module 222. The distance module 222 is representative of functionality to calculate distances 224 that describe image similarity between patches with the partitions 210 as well as distances 224 between partitions 210, one to another. For example, a shorter distance between images indicates that the images may have a similar structure whereas a longer distance indicates a structure that is less similar between the images. These distances may be utilized in a variety of different ways as part of image processing operations, such as to weight application of image processing operators, as part of formation of the tree-like structure to support a partition search, and so on, examples of which are further described below and shown in corresponding figures.

Figure 3:
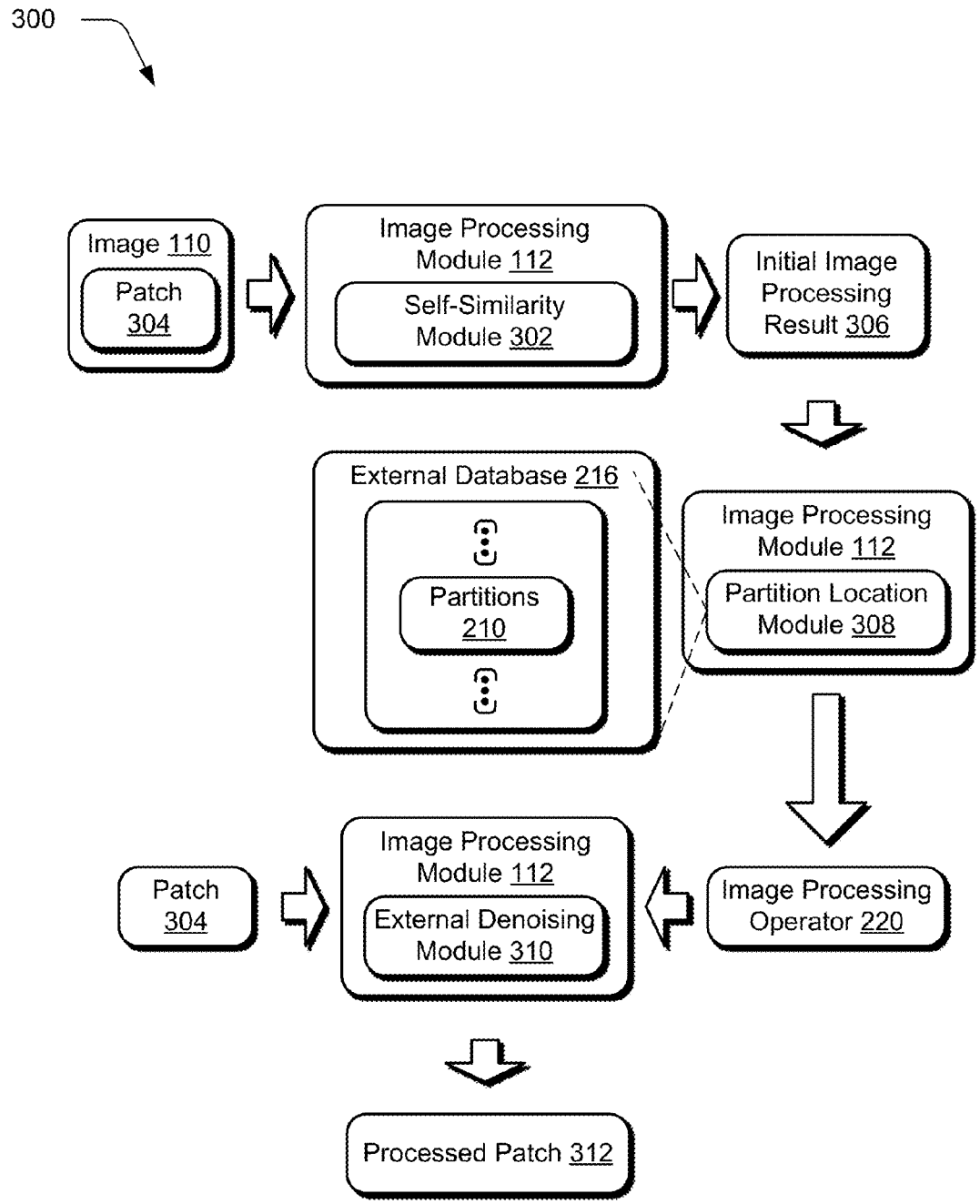
FIG. 3 is an illustration of a system in an example implementation showing an image denoising module of FIG. 1 in greater detail.

FIG. 3 depicts a system 300 in an example implementation showing the image processing module 118 as employing the external database 216 constructed in FIG. 2 to process an image. As the image processing operators 220 are learned on square patches in this example (although other shapes are also contemplated), an input image that is to be processed (e.g., a noisy image) may be represented with a set of overlapping square patches. In the following example, although image denoising is described it should be apparent that a wide variety of other image processing techniques involving patches are also contemplated.

The image processing module 112 is illustrated as including a self-similarity module 302. The self-similarity module 302 is representative of functionality to process a patch 304 (e.g., a "noisy" patch) of the image 110 to obtain an initial image processing result 306, e.g., an initial denoising result for the patch 304 from the image 110.

The initial image processing result 306 may then be used by a partition location module 308 of the image processing module 112 to locate one or more of the partitions 210 in the external database 216 that correspond to the initial image processing result 206. For example, centroids of each of the partitions 210 may be arranged in a tree-like structure that may be utilized to locate a partition 210 that corresponds to the initial image processing result 306. In this way, an image processing operator 220 may be found in the external database 216 that corresponds to the initial image processing result 306 through correspondence with the found partitions 210.

The image processing operator 220 is then applied to the patch 304 to generate a processed patch 312, i.e., a patch that is denoised by leveraging the external database 216. Overlapping processed patches 312 may then be combined for individual pixels as a weighted average to arrive at a final result for processing of the image 110 as a whole, such as through use of distances 224 calculated for the patches that describe similarity of patches in the image 110, one to another.

Thus, once located, an image processing operator 220 that is associated with that partition 210 is then utilized to process the patch 304. This image processing operator 220 may also be utilized to process other patches that are located in the partition 210 from which the patch 304 was selected. Therefore, for each partition 210, a single patch 304 may be used as the reference and a search may be performed for the nearest neighbor partition or nearest neighbor patch for that patch 304. A result of the search, e.g., the image processing operator 220, may then be applied to other patches from the image 110 that were assigned to the same partition 210. In another example, k-nearest neighbors of the reference patch 304 may be defined as the partition 210, and for other patches, a scan may be performed for the closest patches inside the pool as refinement.

Figure 4:
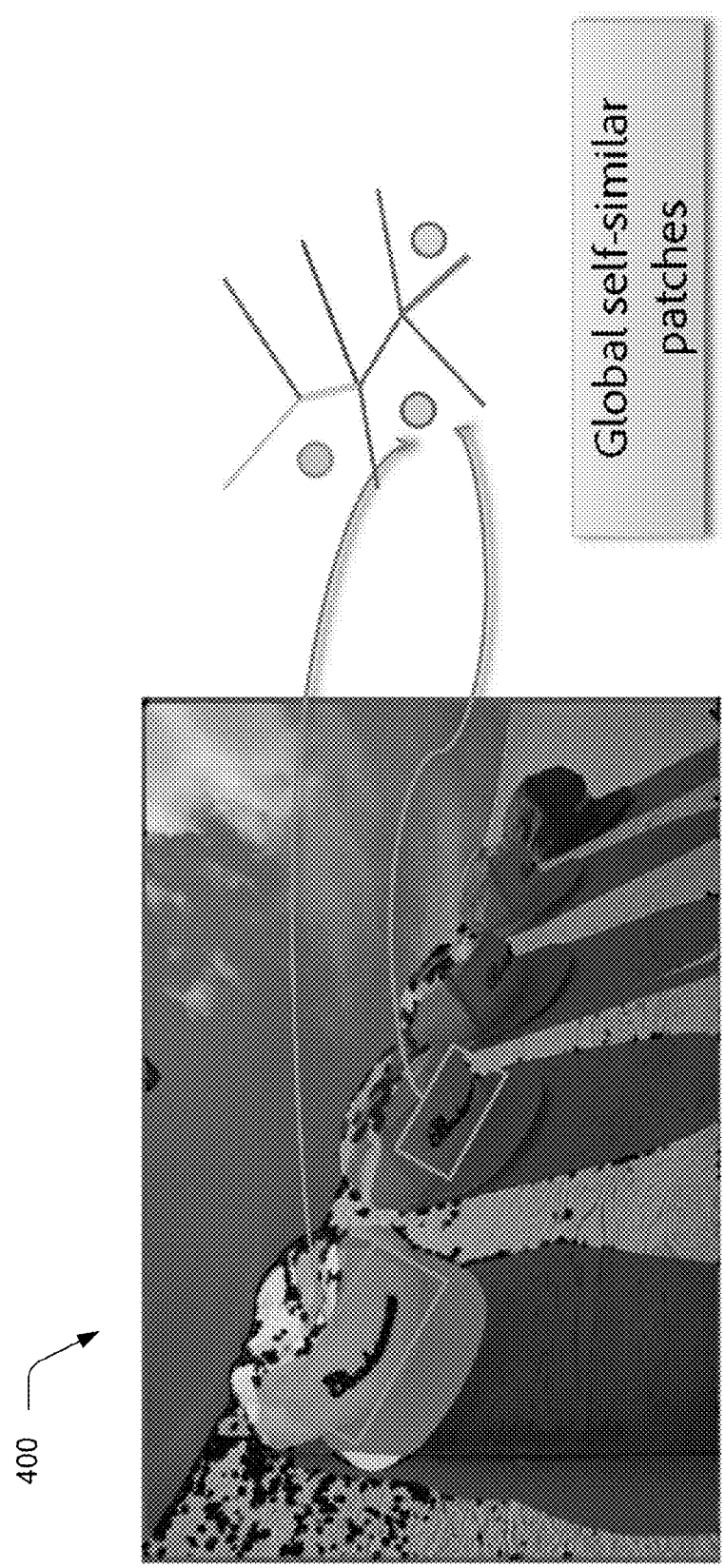
FIG. 4 depicts an example showing global grouping of self-similar patches from an image.

Convention image processing techniques that involve patches, such as denoising, typically are limited to consideration of locally similar patch due to high computational complexity. In this example, however, the use of pre-trained partitions 210 in an external database 216 may be used to improve efficiency of these operations. For example, patches 304 taken from an image 110 to be processed may be arranged into partitions 210 of the external database 216 to build similar groups across the whole image 110. An example 400 of this is shown in FIG. 4 in which patches that include text taken from similar hats at different locations of an image are assigned to a same partition. Thus, whereas exhaustively computing distances between far-away patches can be computationally expensive using conventional techniques, the use of the partitions may be leveraged to improve efficiency of this process. Computation of the variance of each partition may be performed to characterize distance statistics or bounds of distances between any two patches inside a partition as previously described.

Additionally, these techniques may also leverage the lookup table 226 to access data describing distances between partition centers, which can be directly used to even compute approximate distances between two patches in different partitions. The lookup table 226 can also be used to find a neighboring partitions which can be used to automatically grow a similar patch group for a test image when the number of patches in each partition is not enough for certain applications. For example, a particular partition may not include a threshold number of patches and therefore the distances 224 in the lookup table 226 may be utilized to find another partition that is similar. Patches from this other partition may thus be used to "grow" a number of available patches to perform image processing.

As previously described, partitions may also be leveraged to distinguish common from complex patches, with different image processing techniques being performed based on this distinction. For patches that reoccur in many images of a training set (i.e., "common" patches), an image processing operator (e.g., denoising operator) may be learned for those patches as described in relation to FIG. 2. This image processing operator may then be used for a patch 304 taken from an image 110 to be processed. For patches that reoccur in a limited number of images (e.g., below a threshold number), these patches may be considered "complex patches" and therefore an image processing operator may be generated from patches that are internal to the image 110, i.e., that are included in that same image. In this way, efficiency in the processing of the common patches may be improved while still preserving image structure in the patch for complex patches that do not have a structure that corresponds to the partitions.

The described approach has been evaluated based on both the Peak Signal-to-Noise Ratio (PSNR) and the subjective visual quality on real images. As shown in the following table, a numerical comparison of the partition techniques is presented with NLM and BM3D.

| Approaches | Pepper | Hill | Couple | Man | Boat | Lena | Fingerprint |
|---|---|---|---|---|---|---|---|
| NLM | 37.27 | 36.28 | 36.63 | 36.86 | 36.34 | 37.83 | 34.12 |
| BM3D | 38.12 | 37.13 | 37.52 | 37.82 | 37.28 | 38.72 | 36.51 |
| Partition Tech. | 38.09 | 37.10 | 37.40 | 37.70 | 37.05 | 38.60 | 36.42 |

Figure 5:
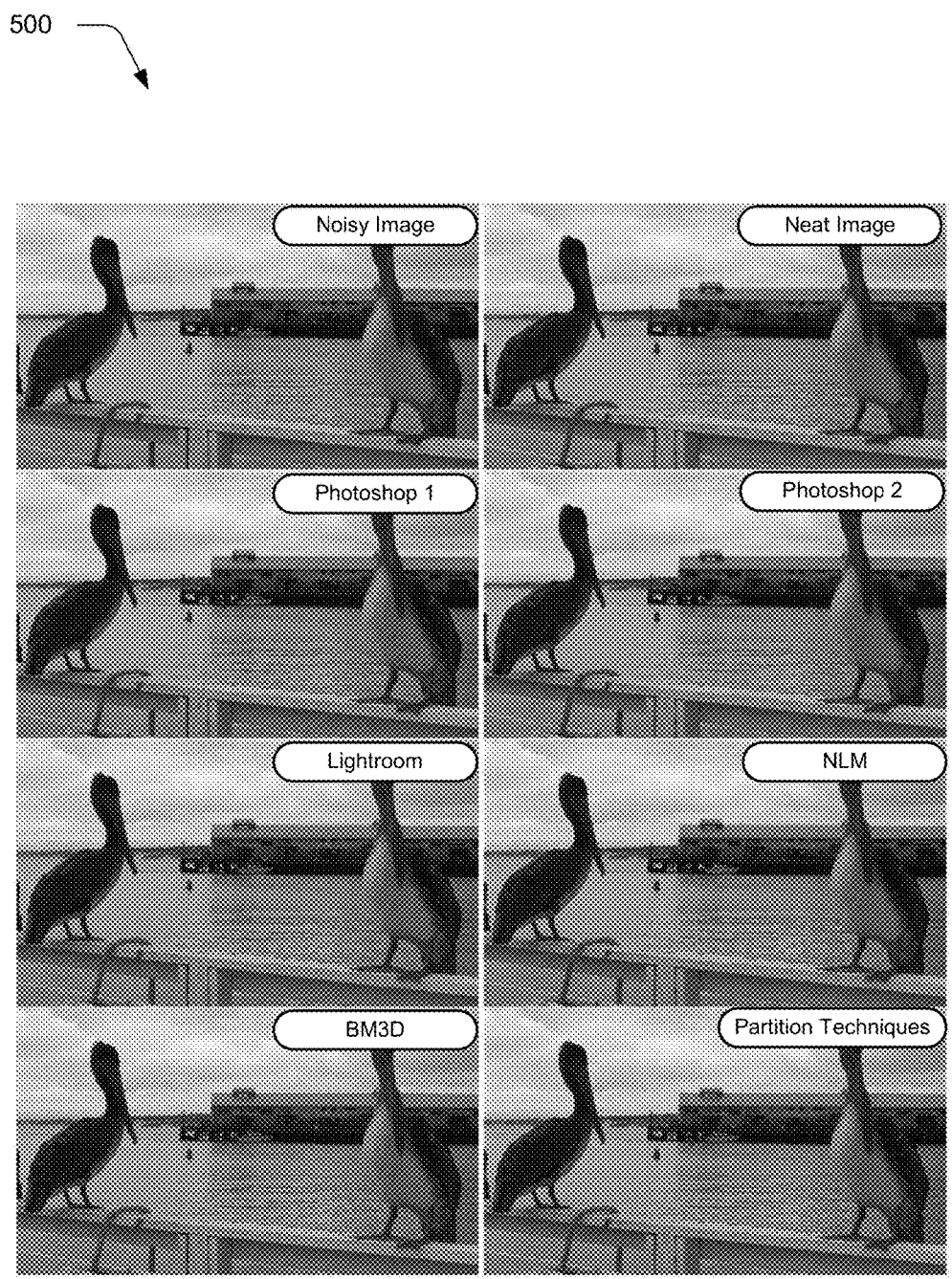
FIG. 5 depicts an example of eight instances of denoising results on real images.

As shown in the example 500 of FIG. 5, eight instances of denoising results on real images are shown. Comparisons were made among the state-of-the-art applications and algorithms, including Neat Image, Photoshop®, another Photoshop® technique (i.e., smart sharpen), Lightroom®, NLM, and BM3D. In general, the techniques described herein exhibit results are comparable to BM3D, and better than other results with reduced computational complexity and thus improved efficiency in the use of computational resources.

Example Procedures

The following discussion describes image denoising techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
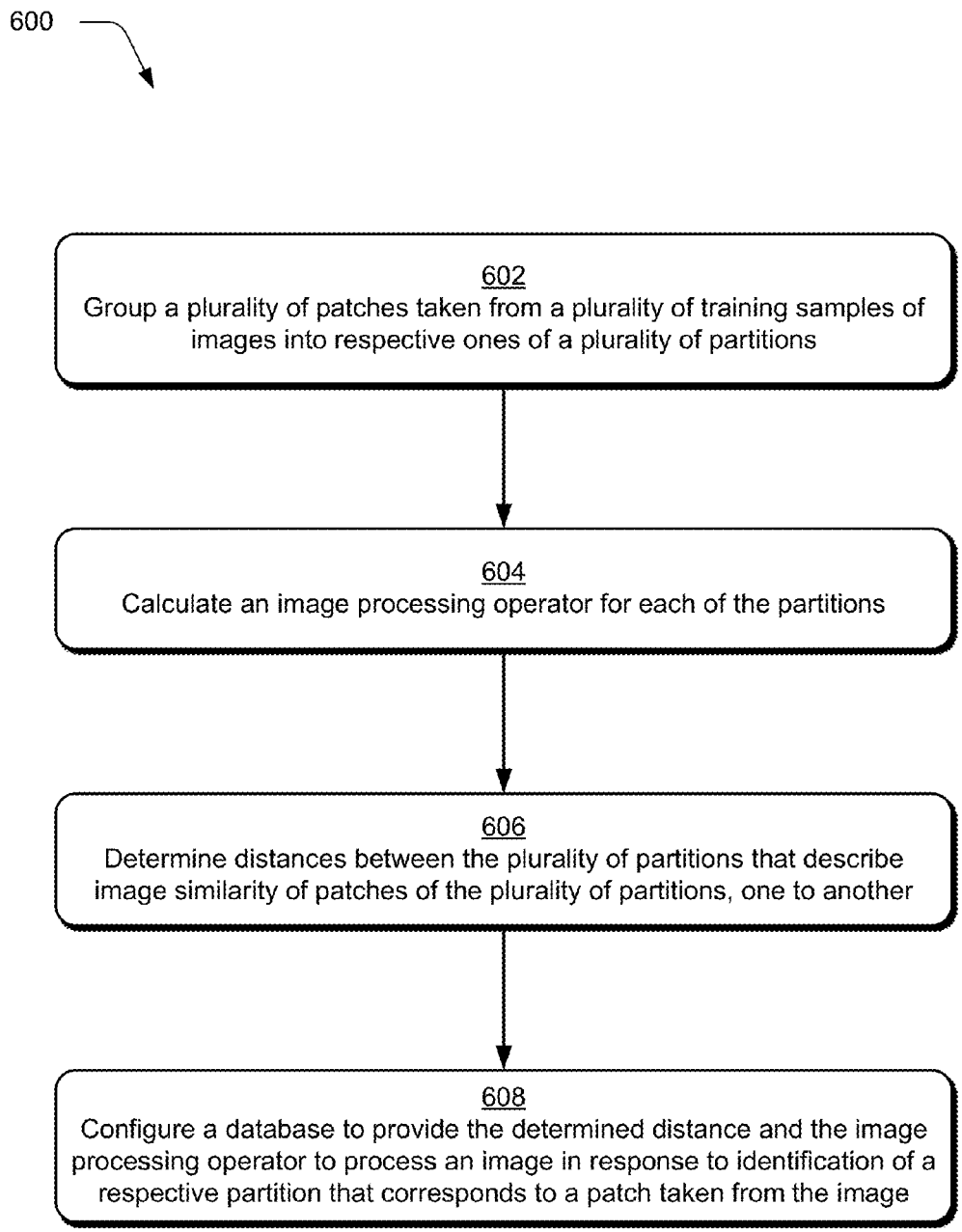
FIG. 6 is a flow diagram depicting a procedure in an example implementation in which an external database of partitions is generated.

FIG. 6 depicts a procedure 600 in an example implementation in which an external database of partitions is generated. A plurality of patches taken from a plurality of training samples of images are grouped into respective ones of a plurality of partitions (block 602). An external database construction module 116, for instance, may process a training set of images 204 to form a plurality of overlapping patches 206, e.g., five by five square patches or other sizes and shapes. These patches 206 may then be grouped by a partitioning module 208 into respective partitions 210 based on similarity of the patches 206, one to another. In one or more implementations, a binary classifier module 212 may be utilized to classify the patches as common or uncommon, such as based on size of the partitions or other characteristics.

An image processing operator is calculated for each of the partitions (block 604). Continuing with the previous example, the partitions 210 may be configured to support a variety of different image processing operations, such as image denoising, optical flow, super resolution, and so on as previously described. Accordingly, an image processing operator 220 may be pre-computed for each of these partitions by an image processing operation module 218. The image processing operator 220 may then be used for subsequent processing of other images, such as image 110 as described above.

A determination is also made of distances between the plurality of partitions that describe image similarity of patches of the plurality of partitions, one to another (block 606). A lookup table 226, for instance, may be generated that describes distances 224 between patches 214 within a partition 210 as well as distances between partitions 210, one to another. These distances 224 may be used to quantify how similar the partitions 210 and/or corresponding patches 214 are to each other. Accordingly, these distances 224 may be utilized to support a variety of different functionality, such as to "grow" a quantity of patches, as a basis for a weighted average that is computed as part of image processing, and so forth.

A database is configured to provide the determined distance and the image processing operator to process an image in response to identification of a respective said partition that corresponds to a patch taken from the image (block 608). In this way, an external database 216 may be pre-computed that may be leveraged to assist in subsequent image processing and thus conserve valuable computing resources as further described below.

Figure 7:
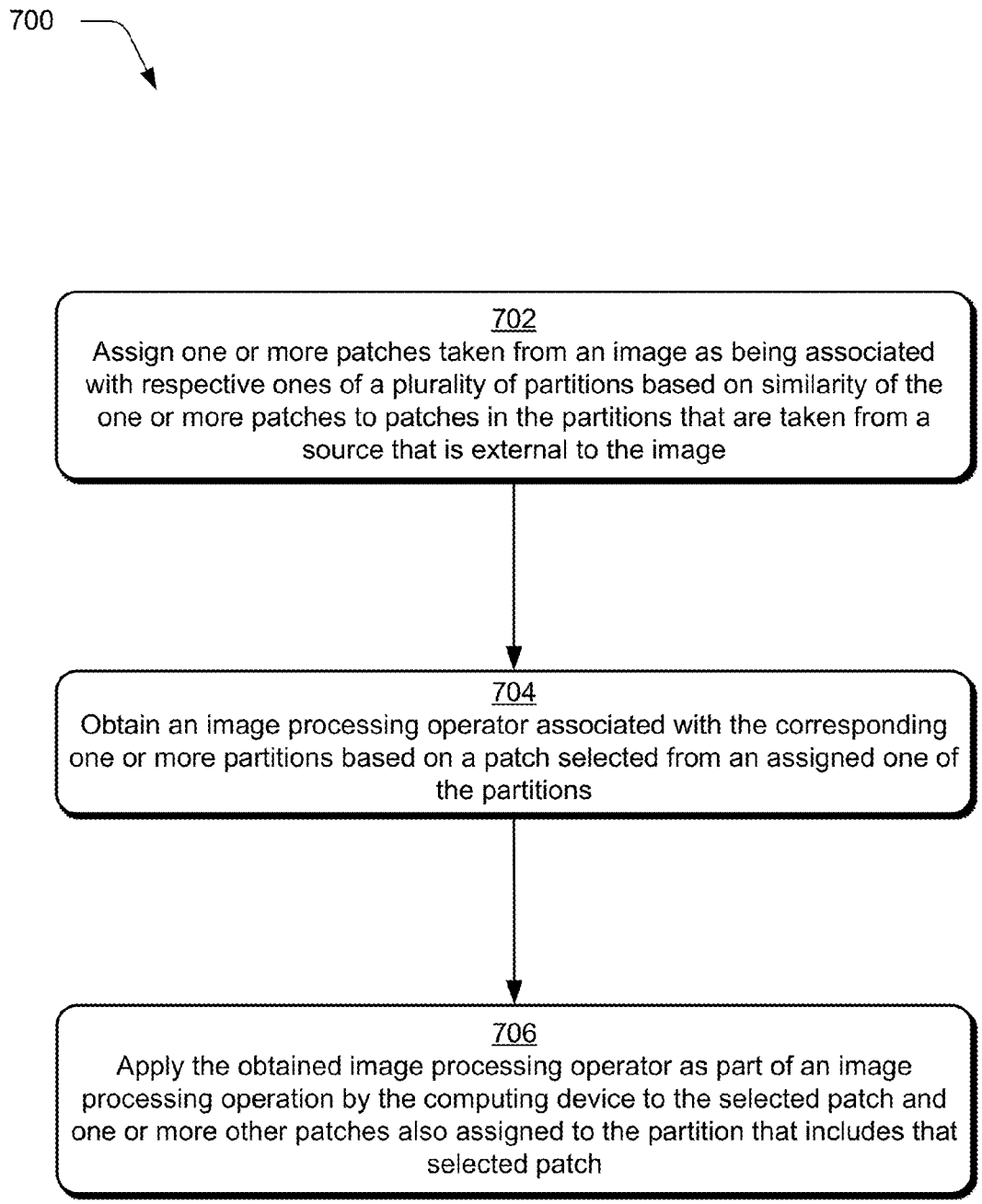
FIG. 7 is a flow diagram depicting a procedure in an example implementation in which an image is processed by leveraging partitions of an eternal database.

FIG. 7 depicts a procedure 700 in an example implementation in which an image is processed by leveraging partitions of an eternal database. One or more patches taken from an image are assigned as being associated with respective ones of a plurality of partitions based on similarity of the one or more patches to patches in the partitions that are taken from a source that is external to the image (block 702). A partition location module 308, for instance, may walk a tree like structure of an external database 216 to locate partitions 210 that correspond to respective patches 304. In this way, the partition location module 308 may leverage the pre-computed external database 216 to efficiently assign the patch 304.

An image processing operator associated with the corresponding one or more partitions is obtained based on a patch selected form an assigned one of the partitions (block 704). As described in relation to FIG. 2, the image processing operators 220 may also be pre-computed along with the partitions 210 in the external database 216, thereby conserving resources when processing a desired image. Additionally, a patch may be selected from one of the partitions that is representative of the partition.

The obtained image processing operator is applied as part of an image processing operation by the computing device to the selected patch and one or more other patches also assigned to the partition that includes the selected patch (block 706). Thus, in this way a single search may be performed to find an image processing operator that corresponds to each of the patches assigned to the partition of that operator.

Figure 8:
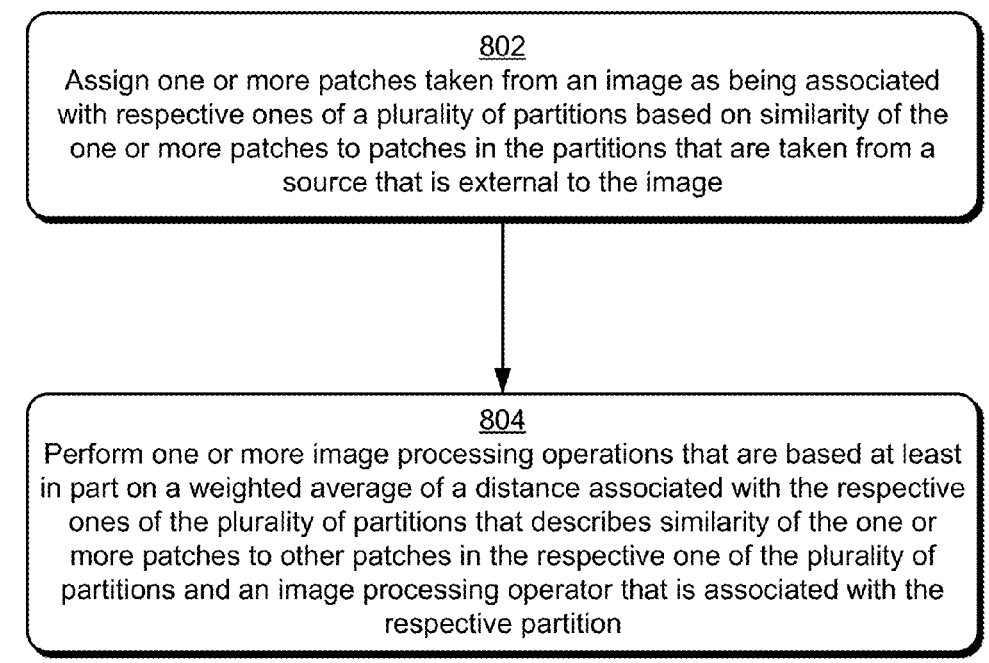
FIG. 8 is a flow diagram depicting a procedure in an example implementation in which image processing operators and image distances associated with partitions are leverage to process an image.

FIG. 8 depicts a procedure 800 in an example implementation in which image processing operators and image distances associated with partitions are leveraged to process an image. One or more patches taken from an image are assigned as being associated with respective ones of a plurality of partitions based on similarity of the one or more patches to patches in the partitions that are taken from a source that is external to the image (block 802). An image 110, for instance, may be sampled to form a plurality of patches 402 as before. In this instance, however, the patches may be assigned to partitions 210 of an external database 216 having common patches 214. Thus, if there is a match in this example the patch may be considered "common" and processed by leveraging the external database 216.

One or more image processing operations are performed that are based at least in part on a weighted average of a distance associated with the respective ones of the plurality of partitions that describes similarity of the one or more patches to other patches in the respective one of the plurality of partitions and an image processing operator that is associated with the respective partition (block 804). The distance, as previously described, describes image similarity (e.g., structure, texture, color, and so on) of patches to each other. Thus, this distance may be a basis of a weighted average of image processing operators 220 that are used to process the patch. Further, as previously described through use of the external database 216, efficiency of the overall operation may be improved as the external database 216 may be precomputed. A variety of other examples are also contemplated as previously described.

Example System and Device

Figure 9:
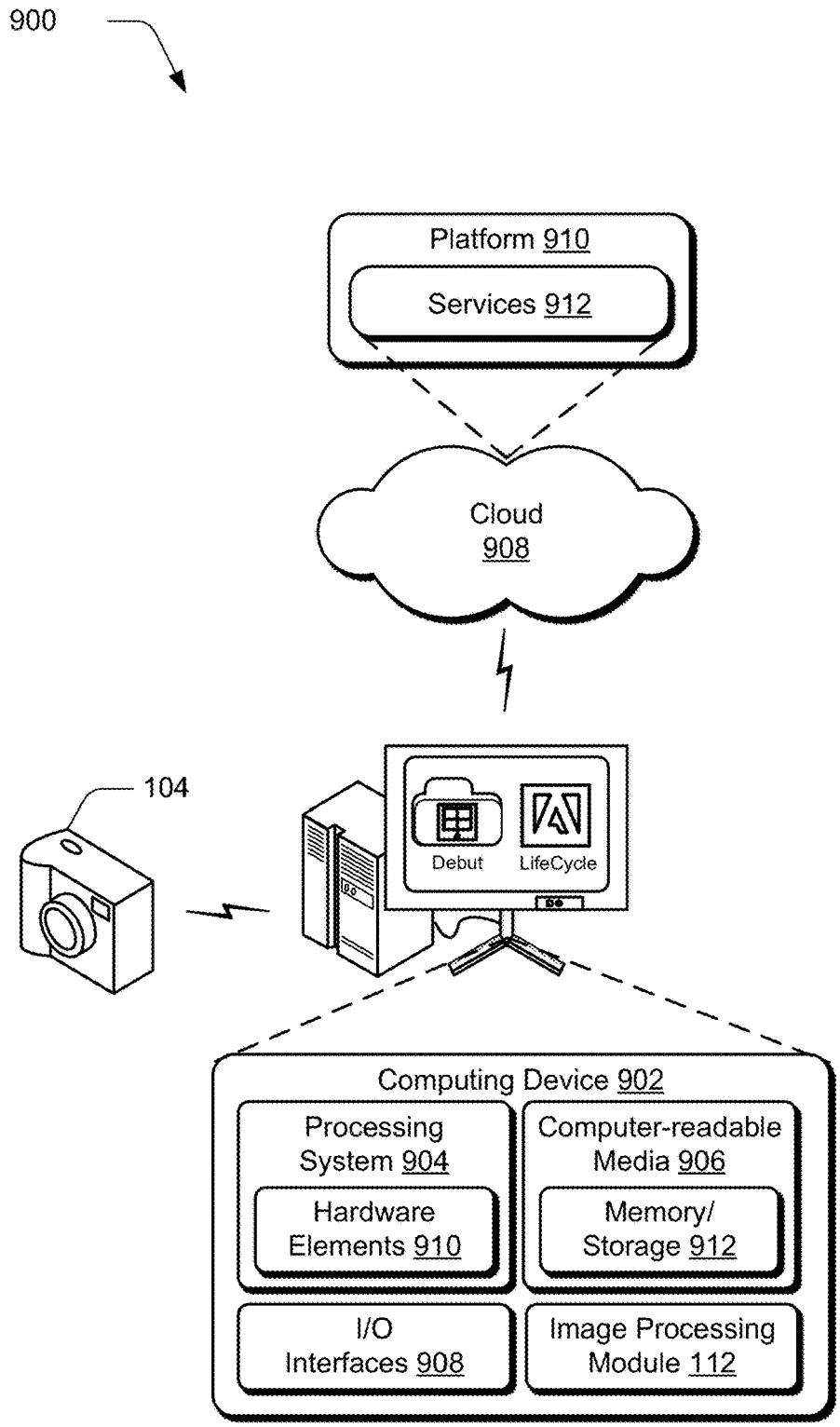
FIG. 9 illustrates an example system generally that includes an example computing device that is representative of one or more computing systems and/or devices that may implement the various techniques described herein.

FIG. 9 illustrates an example system generally at 900 that includes an example computing device 902 that is representative of one or more computing systems and/or devices that may implement the various techniques described herein. This is illustrated through inclusion of the image processing module 112, which may be configured to process image data, such as image data captured by an image capture device 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
obtaining a plurality of example training samples taken from example images, each example training sample having a plurality of example patches;
grouping the example patches into respective ones of a plurality of partitions, the example image patches in a partition being similar one to another;
calculating an image processing operator for each of the partitions based at least in part on a weighted average of corresponding pixels in the example image patches in the respective partition;
determining distances between the plurality of partitions that describe image similarity of patches of the plurality of partitions, one to another; and
configuring a storage to provide the determined distances and the image processing operator to process an image with an image denoising, texture synthesis, optical flow, or super-resolution operation in response to identification of a respective said partition that corresponds to a patch taken from an image external to the storage.

2. A method as described in claim 1, wherein the plurality of partitions are arranged in a tree-like structure that describes image similarity of patches included in the partitions, one to another.

3. A method as described in claim 1, wherein the distances are used as part of processing of the image to locate a second said partition based on a determination that a first said partition that is found as corresponding to the patch does not include at least a threshold number of example image patches.

4. A method as described in claim 3, wherein the locating the second said partition includes performing a nearest neighbor search.

5. A method as described in claim 3, wherein the locating the second said partition is based on the distance between the first said partition and the second said partition.

6. A method as described in claim 5, wherein:
the locating the second said partition includes querying a lookup table to find the distance; and
the lookup table is pre-computed along with the plurality of partitions before the locating the second said partition.

7. A computing device comprising:
at least one processor; and
one or more computer-readable storage media having instructions stored thereon that, responsive to execution by the at least one processor, causes the at least one processor to implement functionality including:
obtaining a plurality of example training samples taken from example images, each example training sample having a plurality of example patches;
grouping the example patches into respective ones of a plurality of partitions, the example image patches in a partition being similar one to another;
calculating an image processing operator for each of the partitions based at least in part on a weighted average of corresponding pixels in the example image patches in the respective partition;
determining distances between the plurality of partitions that describe image similarity of patches of the plurality of partitions, one to another; and
configuring a storage to provide the determined distances and the image processing operator to process an image with an image denoising, texture synthesis, optical flow, or super-resolution operation in response to identification of a respective said partition that corresponds to a patch taken from an image external to the storage.

8. A computing device as described in claim 7, wherein the plurality of partitions are arranged in a tree-like structure that describes image similarity of patches included in the partitions, one to another.

9. A computing device as described in claim 7, wherein the distances are used as part of processing of the image to locate a second said partition based on a determination that a first said partition that is found as corresponding to the patch does not include at least a threshold number of example image patches.

10. A computing device as described in claim 9, wherein the locating the second said partition includes performing a nearest neighbor search.

11. A computing device as described in claim 9, wherein the locating the second said partition is based on the distance between the first said partition and the second said partition.

12. A computing device as described in claim 11, wherein:
the locating the second said partition includes querying a lookup table to find the distance; and
the lookup table is pre-computed along with the plurality of partitions before the locating the second said partition.

13. One or more computer-readable storage media having instructions stored thereon that, responsive to execution by the at least one processor, causes the at least one processor to implement functionality including:
obtaining a plurality of example training samples taken from example images, each example training sample having a plurality of example patches;
grouping the example patches into respective ones of a plurality of partitions, the example image patches in a partition being similar one to another;
calculating an image processing operator for each of the partitions based at least in part on a weighted average of corresponding pixels in the example image patches in the respective partition;
determining distances between the plurality of partitions that describe image similarity of patches of the plurality of partitions, one to another; and
configuring a storage to provide the determined distances and the image processing operator to process an image with an image denoising, texture synthesis, optical flow, or super-resolution operation in response to identification of a respective said partition that corresponds to a patch taken from an image external to the storage.

14. One or more computer-readable storage media as described in claim 13, wherein the plurality of partitions are arranged in a tree-like structure that describes image similarity of patches included in the partitions, one to another.

15. One or more computer-readable storage media as described in claim 13, wherein the distances are used as part of processing of the image to locate a second said partition based on a determination that a first said partition that is found as corresponding to the patch does not include at least a threshold number of example image patches.

16. One or more computer-readable storage media as described in claim 15, wherein the locating the second said partition includes performing a nearest neighbor search.

17. One or more computer-readable storage media as described in claim 15, wherein the locating the second said partition is based on the distance between the first said partition and the second said partition.

18. One or more computer-readable storage media as described in claim 17, wherein:
the locating the second said partition includes querying a lookup table to find the distance; and
the lookup table is pre-computed along with the plurality of partitions before the locating the second said partition.

19. The method as described in claim 1, wherein the grouping the example patches includes determining a variance between respective example patches and bounding the variance allowed in each respective partition.

20. A computing device as described in claim 7, wherein the grouping the example patches includes determining a variance between respective example patches and bounding the variance allowed in each respective partition.

* * * * *